United States Patent Office 3,671,107
Patented June 20, 1972

3,671,107
OPTICAL LOW-PASS SPATIAL FILTERS
George Biernson, Concord, Raymond Euling, Sudbury, and Paul W. Jones, Franklin, Mass., assignors to Sylvania Electric Products Inc.
Original application Oct. 29, 1968, Ser. No. 771,585, now Patent No. 3,615,433. Divided and this application Oct. 5, 1970, Ser. No. 78,266
Int. Cl. G02b 27/00
U.S. Cl. 350—162 SF          1 Claim

ABSTRACT OF THE DISCLOSURE

An optical low-pass spatial filter for low pass spatially filtering photographic imagery information. The low-pass spatial filter includes a source of diffused illumination, a mask disposed in front of the source of diffused illumination and having a circularly-symmetric transmissivity pattern, and a lens spaced in front of the mask a distance equal to the focal length of the lens for refracting illumination directed thereon from the source of illumination after passage through the mask.

CROSS-REFERENCE TO RELATED APPLICATION

This application is a division of application Ser. No. 771,585, filed Oct. 29, 1968, now Pat No. 3,615,433 and assigned to the assignee of the present application.

BACKGROUND OF THE INVENTION

The present invention relates to imagery processing and, more particularly, to a feedback image enhancement process for enhancing the details of photographic images.

High-quality photographic film is available that can record clearly photographic negative images over a range of light intensities of about 1000:1. Such a high range of light intensities is needed for photographing high-contrast outdoor scenes in order to record detail effectively both in brightly-lighted areas and in dimly-lighted areas. For effective viewing, it is usually desirable to derive positive paper prints from negatives of such scenes. However, the range of light intensities that can be recorded clearly on photographic printing paper is quite low, often not much greater than 10:1, and so a great deal of imagery detail in a negative of a high-contrast scene can be lost in making a positive print therefrom. To avoid this loss of imagery detail, the range of the imagery data recorded on the photographic negative is often compressed so that it can be conveyed effectively on a photographic medium of low dynamic range. This compression of the range of the imagery data is referred to herein as "image enhancement."

The basic philosophy underlying image enhancement is that by illuminating the dark areas of a negative strongly, and the light areas weakly, the operating range of illumination applied to expose a positive can be made to be much lower than the range of transmissivity values of the negative. Ideally, the illumination is varied gradually over the negative in order that the pattern of the illumination does not itself contribute artificial detail to the image recorded on the positive. Thus, the positive records an enhanced image of relatively low operating range. The same image enhancement effect can also be achieved by placing a medium of non-uniform transmissivity between the negative and a film and uniformly illuminating the negative to expose the film through the medium of non-uniform transmissivity. The medium of non-uniform transmissivity operates to attenuate weakly the light from the dark areas of the negative and to attenuate greatly the light from the light areas of the negative.

The approximate effect of the above-described image enhancement, whether using varying amounts of illumination or a medium of non-uniform transmissivity, is to compensate to a large extent for variations of illumination on the original scene. Consequently, the enhanced image recorded on the positive is similar to what would be recorded without image enhancement if the illumination on the original scene were much more uniform.

Various conventional prior art methods and apparatus have been employed heretofore for enhancing photographic images to compress the range of the photographic data contained in a negative or a positive. Two methods, one photographic in nature and the other electro-optical in nature, have been widely used to implement image enhancement. Each of these methods can be employed to produce an enhanced positive from an original negative, or to produce an enhanced negative from an original positive. For simplicity, the following discussion will consider only the former alternative; however, the latter alternative is essentially the same.

In the photographic method of image enhancement, a negative of a scene is uniformly illuminated and the image impressed thereon is "blurred" by suitable photographic apparatus. An unexposed film spaced from the negative is exposed with the blurred image and then developed to form a blurred positive, the blurred positive being designated a "mask". The mask is characteristically dark in the regions where the original negative is light, and light in the regions where the original negative is dark. The mask is then superimposed on the original negative, and the mask-negative combination is uniformly illuminated. The combined images of the mask and the original negative are then focused onto an unexposed film spaced from the mask-negative combination, which film is exposed with the images and then developed to represent the desired "enhanced positive." Since the above-described mask is dark in the regions where the original negative is light, and vice versa, the range of light intensities focused onto the second positive, i.e., the enhanced positive, can be much lower than the range of transmissivity values of the enhanced positive. In other words, the range of imagery data is compressed. Moreover, since the image on the mask is blurred, it does not add very much imagery detail to the enhanced positive.

The "blurred" positive in the above-described photographic method is often formed by using suitable photographic apparatus to expose a "defocused" image of the negative on the film used to form the positive mask. The primary effect of defocusing the image on the negative is to attenuate the high spatial-frequency components of the image, and thereby to blur the sharp lines of demarcation between the light and dark areas of the image. Therefore, the blurring operation represents a low-pass spatial filtering. There are many other ways that this low-pass spatial filtering of the image can be implemented which have different effects on how the components of the image are modified. However, these differences do not alter the basic principle of image enhancement.

As a variation of the above-described method for deriving an enhanced positive, a mask is obtained as in the above-described method (by exposing and developing a film with a blurred negative image), the original negative is spaced from the mask, and the mask illuminated so that the illumination falling on the negative is a defocused (or blurred) image of the mask. The image of the illuminated negative is then forcused onto film to expose an enhanced positive. The above operation provides two stages of low-pass spatial filtering, the first stage of low-pass spatial filtering operating between the negative and the mask, and the second stage then operating between the mask and the negative.

In the electro-optical prior art method of photographic image enhancement, an original negative of a scene is scanned with a broad beam of light from a cathode ray tube. The cathode ray tube is controlled so as to have a scan rate which is varied in accordance with the amount of light energy that passes through the negative. Typically, the beam used to scan the negative is made much broader than the image detail on the negative but much narrower than the negative itself. The negative is scanned with the light beam and the light energy passing through the negative is sampled by a photo-detector to control appropriately the scan rate of the cathode ray tube. More particularly, the scan rate of the cathode ray tube is controlled such that the greater the amount of light energy measured by the photo-detector, the faster is the scan rate. The variations in light energy therefore cause the beam to scan rapidly over the low-density areas (light areas) of the negative and slowly over the high-density areas (dark areas). The illuminated image produced by scanning the negative with the light beam is focused onto suitable unexposed film, which is exposed by the image and then developed to form the enhanced positive.

Although the electro-optical method of image enhancement is implemented in quite a different manner from the basic photographic method described above, the two methods are mathematically equivalent. More specifically, it can be demonstrated that the same pattern of light energy applied to the negative by the cathode ray tube can be achieved by the photographic method if two stages of low-pass spatial filtering are employed as described hereinabove, that is, between the negative and the mask and then between the mask and the negative.

The image enhancement techniques and methods desiribed above are fairly effective in compressing the range of imagery data in many photographic situations. However, they have rather severe weaknesses which restrict their usefulness in especially critical photographic applications. In particular, use of the above techniques and methods results in a loss of imagery detail in regions of a photographic image close to abrupt discontinuities of lighting on the original scene. A fundamental theoretical weakness of the above-described image enhancement is that the image on the negative is low-pass spatially filtered in forming the mask. Spatial filtering of the image on the negative is undesirable because the range of transmissivity values of the negative is generally very large and, therefore, the image cannot be processed in the most effective fashion by spatial filtering. More particularly, the problem is that spatial filtering adds together contributions from different parts of the image. Therefore, in regions of the image near sharp discontinuities of lighting, the spatial filtering adds together contributions from very light and very dark areas of the negative, with the result that the contributions from the dark areas are swamped out by those from the light areas. Consequently, the image enhancement is poor in these regions, and imagery detail is often lost.

Another method which has been used for "enhancing" photographic images which merits brief discussion is commonly known as "dodging" or "shading." In this method, a photographer prepares masks of varying transmissivities cut to the shape of the light areas of the negative, and places them between the negative and the positive that is being exposed. The masks are moved (or "dodged") during the exposure, so that their outlines do not occur as detail on the positive. The effect of the masks is to attenuate the light from the low-density areas of the negative and thereby compress the range of the exposure values applied to the positive. A general disadvantage of the dodging method is that the masks are prepared in accordance with the qualitative judgment of the photographer. Consequently, parts of the imagery detail on the negative may be lost or obscured, or by imagery detail may be confused by undesirable artifacts resulting from use of the masks. Therefore, the effectiveness of the "dodging" method has been quite limited in many photographic applications where clarity and correctness of detail are strict requirements.

SUMMARY OF THE INVENTION

Briefly, the present invention relates to a reiterative feedback image enhancement process which comprises an initial cycle followed by at least one subsequent cycle and a final operation. In the initial cycle of the reiterative feedback image enhancement process, an original image relating to a scene is produced from which a compressed image is derived, the values of the compressed image being a fixed function of the corresponding values of the original image. A filtered image is then formed by low-pass spatially filtering the compressed image. The initial cycle is completed by deriving a mask image from the filtered image, the values of the mask image being a fixed function of the corresponding values of the filtered image.

In each subsequent cycle of the reiterative feedback image enhancement process, a compressed image is derived from the original image and the mask image derived in the preceding cycle, the values of the compressed image being a fixed function of the product of the corresponding values of the original image and the mask image derived in the preceding cycle. A filtered image is then formed by low-pass spatially filtering the compressed images derived in the present cycle and all previous cycles, the values of the filtered image being a weighted average of the corresponding values of the low-pass spatially filtered compressed images derived in the present and all previous cycles. The subsequent cycle is completed by deriving a mask image from the filtered image formed in the preceding step, the values of the mask image being a fixed function of the corresponding values of the filtered image formed in the preceding step.

To conclude the reiterative feedback image enhancement process, the final operation is performed which comprises the step of deriving an enhanced image from the original image and the mask image derived in the preceding cycle, the values of the enhanced image being a fixed function of the product of the corresponding values of the original image and the mask image derived in the preceding cycle.

In the preceding brief description of the reiterative feedback image enhancement process of the present invention, such terms as "image," "fixed function," "fixed function of the product," and "weighted average" have been employed. In order to more clearly understand and appreciate the specific nature of the present invention, a brief discussion of the above terms as to their meanings may be helpful.

The term "image,' in the context of the present invention, is intended to mean a two-dimensional array of data points having real values. An image may be conveyed in many ways, for example, on film as the transmissivity values of the exposed film. Alternatively, if the film is illuminated by even illumination, the intensity values of the light emanating from the film may also represent an image the values of which are proportional to the corresponding values of the image represented by the transmissivity values of the film. As still another example, an image may be conveyed on a cathode ray tube as a two-dimensional array of brightness values.

To define the terms "fixed function," fixed function of the product" and "weighted average," three images A, B, and C, each having a coordinate point $(x, y)$ and a respective value $Z_a$, $Z_b$, and $Z_d$ will be considered. Thus, in the context of the present invention, if a value of the image B at the coordinate point $(x, y)$ is a fixed function of a value of the image A at the corresponding coordinate point $(x, y)$, this means that $Z_b = f(Z_a)$, where $f(Z_a)$ is dependent only on the value $Z_a$ and is independent of any other variable including time and the coordinate point $(x, y)$. Similarly, if a value of the image C at the coordinate point (x,y) is a fixed function of the product of the values of the images A and B at the associated coordinate points (x, y), this means that $Z_c=f(Z_a \cdot Z_b)$, where $f(Z_a \cdot Z_b)$ is dependent only on the product $(Z_a \cdot Z_b)$ and is independent of any other variable including the individual $Z_a$ and $Z_b$ values, time, or the individual coordinate points (x, y). If a value of the image C at the coordinate point (x, y) is a weighted average of the values of the images A and B at the associated coordinate points (x, y), this means that $Z_c=K_1Z_a+K_2Z_b$, where $K_1$ and $K_2$ are constants.

DESCRIPTION OF A PREFERRED METHOD OF THE INVENTION

Fundamental Equations

Figure 1:
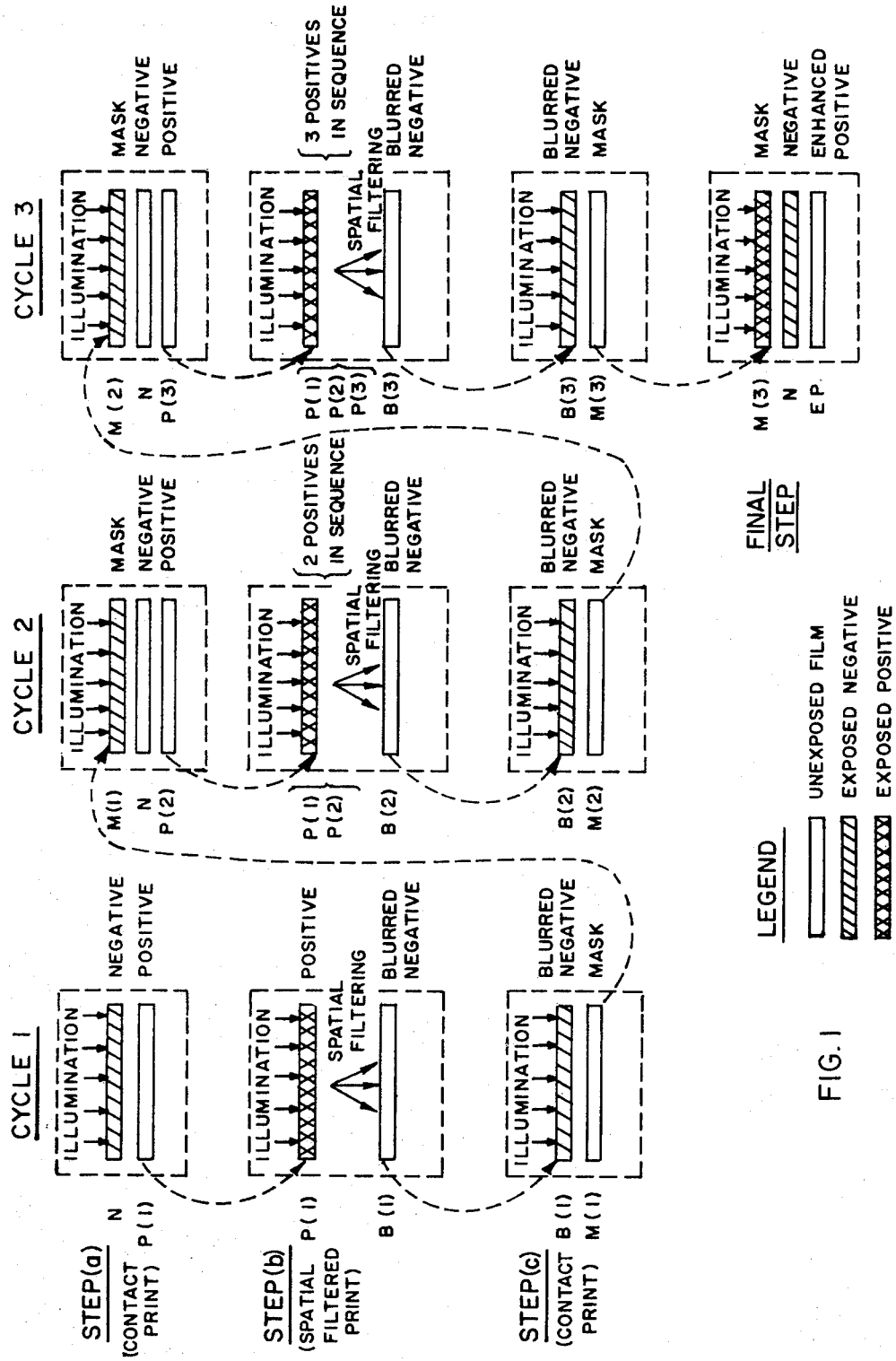
FIG. 1 illustrates in a detailed schematic form the various steps employed in an exemplary three cycles of the feedback image enhancement process of the present invention.

The principal object of the present invention is to produce an image which represents an enhanced version of an original negative image or an original positive image of a scene. Although the principles and concepts of the present invention apply equally well to the derivation of an enhanced negative image or to an enhanced positive image of a scene, the following discussion will be directed to the more common and usual situation in which a negative image of a scene, rather than a positive image of a scene, is derived, and from which an enhanced positive image is produced.

In deriving an enhanced positive image, it is desired that the enhanced positive image satisfy as closely as possible the following equation:

$$T_p = \frac{(B/B_o)e^{-4K\overline{T}_p}}{1+(B/B_o)e^{-4K\overline{T}_p}} \qquad (1)$$

In Equation 1, $T_p$ represents the relative transmissivity of the enhanced positive at any point, B is the brightness of the corresponding point on the scene that was photographed, $\overline{T}_p$ is the value at the corresponding point of a low-pass spatially-filtered modification of the relative transmissivity $T_p$, and K and $B_o$ are constants. The relative transmissivity $T_p$ is defined as the ratio of the actual transmissivity of the enhanced positive to the maximum transmissivity of the unexposed film used to form the enhanced positive. In Equation 1, the parameter K is termed an "enhancement constant," and is a positive constant. In a preferred embodiment of the process of the invention, the enhancement constant K has a value typically about 1.5; the larger the value of the enhancement constant K, the greater is the compression of the photographic data achieved by the feedback image enhancement process of the present invention. The parameter $B_o$ in Equation 1 is a constant which pertains to the relative transmissivity $T_p$ of the enhanced positive. Preferably, the values of the constant $B_o$ is chosen such that the average value of the relative transmissivity $T_p$ over the enhanced positive is approximately equal to 0.5. Theoretical and experimental studies have shown that high quality image enhancement is achieved if Equation 1 is satisfied.

As indicated above, $\overline{T}_p$ represents a low-pass spatially filtered modification of the relative transmissivity $T_p$. The spatial filtering operation at a point having coordinates (x, y) can be described by the integral equation $$\overline{T}_p(x,y) = \frac{\int dx' \int dy' T_p(x-x', y-y')W(r)}{\int dx' \int dy' W(r)} \qquad (2)$$

where $x'$ and $y'$ are variables in the x, y coordinate system over which the integration is performed, r is the radial distance between the point (x, y) and a variable point (x', y'), and is given by $$r = \sqrt{(x-x')^2+(y-y')^2} \qquad (3)$$

and $W(r)$ is a weighting function for the spatial filtering operation. The weighting function $W(r)$ in Equation 2 decreases with increasing values of r.

It may be noted that Equation 1 expresses $T_p$ as a function of $\overline{T}_p$ and Equation 2 expresses $\overline{T}_p$ as a function of $T_p$. These two equations cannot be combined to obtain an explicit relationship between the scene brightness B and the relative transmissivity $T_p$ of the enhanced positive. Therefore, to solve these equations, the present invention uses a reiterative, feedback process which converges to a steady-state solution in which Equations 1 and 2 are both closely approximated. In this feedback process, successively closer approximations of the ideal relative transmissivity $T_p$ are formed in successive cycles of the process.

Equation 1 can also be expressed in the alternative forms $$T_p = (\tfrac{1}{2})\{1+\tanh[-2K\overline{T}_p+(\tfrac{1}{2})\log_e(B/B_o)]\} \qquad (4)$$

and $$T_p = (\tfrac{1}{2})\{1+\tanh[-2K\overline{T}_p+1.15\log_{10}(B/B_o)]\} \qquad (5)$$

To apply these relations to photographic films, it is necessary to consider the general sensitometric properties of film. The density $D_N$ of a negative is defined by $$D_N = \log_{10}(1/T_N') \qquad (6)$$

where $T_N'$ is the absolute transmissivity of the negative. Over a large part of the operating range of most films, the logarithm of the transmissivity is approximately a linear function of the logarithm of the exposure. This region is called the linear range of the film. Hence, in the linear range, the density $D_N$ of the negative is approximately a linear function of the logarithm of exposure $E_N$, and so can be approximately expressed as $$D_N \cong \gamma_N \log_{10} E_N + C_1 \qquad (7)$$

where $\gamma_N$ and $C_1$ are constants. The parameter $\gamma_N$ is called the "gamma" of the film. The exposure $E_N$ applied to the negative at any point is proportional to the brightness B at the corresponding point in the scene. Hence, in the linear range, the density $D_N$ of a point on the negative is related approximately to the brightness B at the corresponding point in the scene by the expression $$D_N \cong \gamma_N \log_{10} B + C_2 \qquad (8)$$

where $C_2$ is a constant. Substituting Equation 8 into Equation 5 gives $$T_p \cong (\tfrac{1}{2})\{1+\tanh[-2K\overline{T}_p+(1.15/\gamma_N)D_N+C_3]\} \qquad (9)$$

where $C_3$ is a constant. The approximation of Equation 9 is considered the best approximation of Equation 5 that can be achieved in a practical manner. Therefore, this approximation is regarded as being the desirable goal for the feed back image enhancement process of the present invention. Thus, the "approximately equal sign" ($\cong$) in Equation 9 can be replaced by an "equal signal" (=), and so the process of the present invention operates to satisfy as closely as possible the equation $$T_p = (\tfrac{1}{2})\{1+\tanh[-2K\overline{T}_p+1.15/\gamma_N)D_N+C_3]\} \qquad (10)$$

To implement Equation 10, a mask is prepared which is then superimposed on the original negative. The density $D_s$ of the mask-negative combination is given by $$D_s = D_N + D_M \qquad (11)$$

where $D_M$ is the density of the mask. In order to implement Equation 10 by means of the mask, Equation 10 is expressed in the forms $$T_p = (\tfrac{1}{2})\{1+\tanh[(1.15/\gamma_N)(D_s+d_o)]\} \qquad (12)$$

and $$T_p = (\tfrac{1}{2})\{1+\tanh[(1.15/\gamma_N)(D_N+D_M+d_o)]\} \qquad (13)$$

where $d_o$ is a constant. Comparing Equations 10 and 13 shows that the density of the mask $D_M$ may be given by $$D_M = -(2/1.15)K\gamma_N \overline{T}_p + d_M = -1.74K\gamma_N \overline{T}_p + d_M \quad (14)$$

where $d_M$ is a constant. As was mentioned heretofore, the constant $B_o$ in Equation 1 is preferably chosen so that the average value of the relative transmissivity $T_p$ over the enhanced positive is equal to approximately 0.5. Consistent therewith, the constant $d_o$ in Equation 13 is preferably chosen so that the average value of the relative transmissivity $T_p$ over the enhanced positive is equal to approximately 0.5.

Since the image enhancement process of the present invention operates in a feedback manner, it is necessary that "damping" be incorporated into the process in order for the reiteration to converge to a suitable solution. The "damping" is achieved by providing "memory" between successive cycles of the feedback process. This memory or damping is achieved by a "damping computation routine" that combines information from successive cycles. An effective computation for achieving the damping is given by $$x_o(q) = [2/(2K+1)]x_i(q) + [(2K-1)/(2K+1)]x_o(q-1) \quad (15)$$

The parameter K in Equation 15 is the previously mentioned "enhancement constant;" $x_i$ and $x_o$ are input and output imagery variables, respectively, of the damping computation routines $x_o(q)$ and $x_o(q-1)$ are output variables for the $(q)$ and $(q-1)$ cycles, respectively, of the feedback image enhancement process; and $x_i(q)$ is the input variable for the $(q)$ cycle. Equation 15 expresses the output variable $x_o$ for one cycle $(q)$ in terms of the output variable for the previous cycle $(q-1)$. If Equation 15 is solved for the relationship between input and output variables, the following equation is derived $$x_o(q) = \left[\frac{2}{2K+1}\right] \sum_{r=0}^{q-1} \left[\frac{2K-1}{2K+1}\right]^r x_i(q-r) \quad (16)$$

Equation 16 shows that the output imagery variable $x_o$ for the damping computation routine is a weighted average of the input imagery variables for the latest and all earlier cycles of the feedback image enhancement process. It can be shown from this equation that after several cycles, as the process approaches a steady state condition, $x_o$ is approximately equal to $x_i$.

The damping computation briefly described above may be conveniently performed in terms of the low-pass spatially-filter variable $\overline{T}_p$. Specifically, the variable $\overline{T}_p$ may be designated as the input imagery variable $x_i$, and $\overline{T}_p{}'$ as the output imagery variable $x_o$. Equations 13, 14, and 16 then become, respectively, $$T_p(q+1) = \tfrac{1}{2}\{1+\tanh [(1.15/\gamma_N)(D_N + D_M(q) + d_o)]\} \quad (17)$$

$$D_M(q) = -1.74K\gamma_N \overline{T}_p{}'(q) + d_{M'} \quad (18)$$

and $$\overline{T}_p{}'(q) = \left[\frac{2}{2K+1}\right] \sum_{r=0}^{q-1} \left[\frac{2K-1}{2K+1}\right]^r \overline{T}_p(q-r) \quad (19)$$

The expression $T_p(q+1)$ of Equation 17 represents the transmissivity of the approximation to the enhanced positive (which may be called simply the "positive") for the $(q+1)$ cycle. In the last cycle of the image enhancement process, the possitive is taken to be the enhanced positive because it represents the closest approximation to the ideal enhanced positive image.

Although Equations 17 through 19 are stated in terms of the imagery variable $\overline{T}_p$, it is to be appreciated that the damping can be performed in terms of other imagery variables. Such modifications, however, do not alter the basic concept of the invention.

Description of the feedback image enhancement process.—FIG. 1

Referring to FIG. 1, there is shown in schematic form and in accordance with a preferred embodiment of the present invention, the various steps of the photographic feedback image enhancement process. As indicated by FIG. 1, the feedback image enhancement process comprises three cycles of three steps $(a)$ through $(c)$, and a final step, which are performed in sequence with feedback being provided between the last step (step $(c)$) in each cycle and the first step (step $(a)$) in the next succeeding cycle, as indicated by the dotted "FEEDBACK" arrows. Although three cycles of steps $(a)$–$(c)$ are shown in FIG. 1, satisfactory photographic feedback image enhancement can often be achieved by only two cycles. The maximum number of cycles required to achieve a desired quality of image enhancement is determined in accordance with the accuracy and precision required in the particular application. Inasmuch as the output of the last step of each cycle (excepting the last cycle) is used in the first step of the next succeeding cycle, the desired output of the process, that is, the output of the final cycle (third cycle), is obtained as a result of an iterative operation in which the output of each successive cycle represents a closer approximation to the ideal output. The operation of the feedback image enhancement process depicted in FIG. 1 will now be described.

For simplicity, the photographic steps $(a)$ and $(c)$ of FIG. 1 are assumed to be implemented by contact printing. However, more complicated optical imaging can be used. In the feedback image enhancement process to be described, different types of films may be used in the three steps $(a)$, $(b)$, and $(c)$, but the same film type is used in the corresponding steps of the various cycles (e.g., step $(b)$ of the third cycle uses the same film as steps $(b)$ of the first and second cycles.)

First cycle.—In step $(a)$ of the first cycle, a negative transparency N recording a photographic image of a scene is uniformly illuminated to expose a photographic film which is then developed to provide a first positive transparency P(1). The photographic film is operated in the non-linear "toe" of its sensitometric curve, and so the range of imagery data recorded on the negative N is compressed in this step. Hence, the first positive P(1) records a "compressed" image. Additionally, the transmissivity values at the points in the first positive P(1) are a fixed function of the transmissivity values of the negative N at the corresponding points. As will be explained more fully hereinafter, the gamma $\gamma_p$ of the positive P(1) film used in step $(a)$ is preferably, though not necessarily, equal to the reciprocal of the gamma $\gamma_N$ of the negative N. The value of the illumination exposure is adjusted in this step so that the relative transmissivity $T_p$ of the first positive P(1) has an average value over the positive preferably equal to $T_p=0.5$, although this particular value need not be satisfied very accurately. As will be shown later, the above conditions cause the process to approximately satisfy Equation 17 for many types of films. (Note that for the first cycle, the density of the mask $D_M(q)$ in Equation 17 is zero.)

Figure 2:
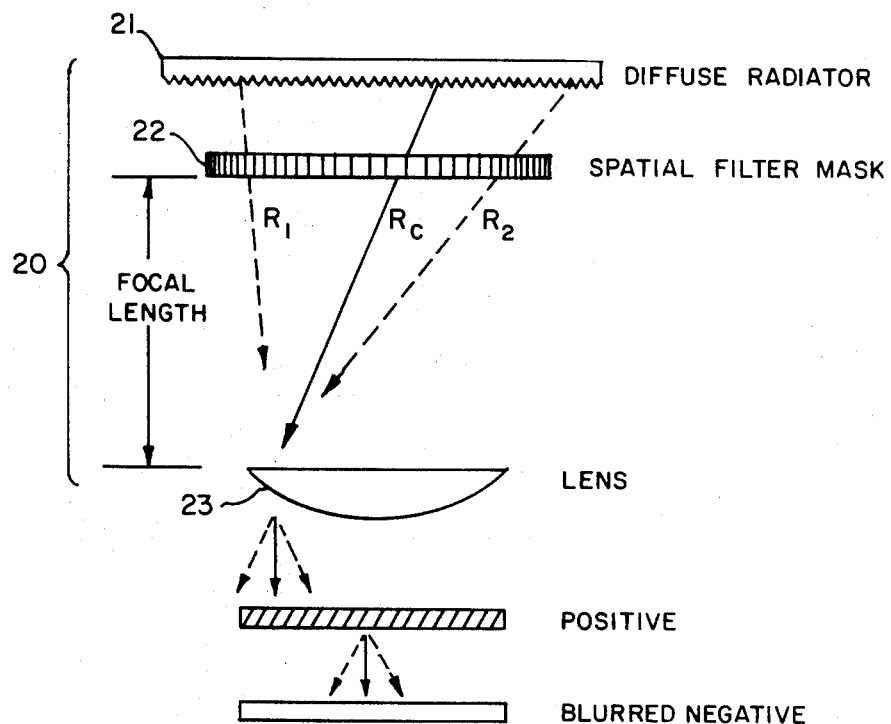
FIG. 2 is a schematic representation of apparatus employed to perform low-pass spatial filtering in accordance with the present invention.

In step $(b)$, the first positive P(1) is uniformly illuminated and the image formed thereby is low-pass spatially filtered (i.e., "blurred") by suitable apparatus of a type such as shown in FIG. 2. Details of the low-pass spatial filtering apparatus of FIG. 2 will later be presented. The blurred image is projected onto a photographic film which is then developed to provide a first blurred negative B(1). Preferably, the photographic film in this step is one which has been previously slightly exposed (or "fogged") with a uniform illumination. The purpose of fogging the film is to cause the film to operate in the desirable part of its sensitometric characteristic. More particularly, the fogging and illumination intensities are adjusted in the present step so that the film exposed by the illumination is operated in the range of its sensitometric curve where density is approximately a linear function of exposure. This condition satisfies Equation 18 as will be explained hereinafter.

In step (c), the first blurred negative B(1) is illuminated uniformly to expose film which is then developed to provide a first mask M(1). The transmissivity values at the points in the first mask M(1) are a fixed function of the exposure values of the first blurred negative B(1) at the corresponding points. The value of the illumination exposure in this step is adjusted such that the film operates in the linear range of its sensitometric curve. Therefore, the density $d_M$ of the mask M(1) is a linear function of the density $D_B$ of the first blurred negative B(1), which in turn is a linear function of the exposure applied to the first blurred negative B(1). Thus, the density $D_M$ of the mask is a linear function of the exposure applied to the blurred negative B(1), a condition which satisfies Equation 18.

As indicated by the dotted "FEEDBACK" arrow in FIG. 1, the first mask M(1) is then used in step (a) of the second cycle of the process. The mask M(1) contains a blurred positive image, and so is dark in the areas where the negative N is light, and vice versa.

Second cycle.—In step (a) of the second cycle, the first mask M(1) is superimposed on the negative N, and the combination is uniformly illuminated to expose a film which is then developed to provide a second (compressed) positive P(2). In this step, the transmissivity values at the points in the second positive P(2) are a fixed function of the product of the transmissivity values at the corresponding points in the negative N and the first mask M(1). As in the first cycle, the value of the illumination exposure is adjusted such that the average value over the image of the relative transmissivity $T_p$ of the second positive P(2) is equal to 0.5. To achieve this value of $T_p=0.5$ requires greater illumination than in the first cycle because of the attenuation provided by the mask M(1).

In step (b), the first positive P(1) exposed in the first cycle and the second positive P(2) exposed in the present cycle are uniformly illuminated in sequence, and the projected images are low-pass spatially filtered (by apparatus such as that of FIG. 2) and directed onto film which has been previously fogged as in the first cycle. The same amount of fogging is used in this step as in the corresponding step of the first cycle. The film is then developed to provide a second blurred negative B(2). It is to be noted that if multiple spatial filtering apparatus is provided in this step, the low-pass spatially filtered positive images may be projected simultaneously onto the fogged film and in registration with each other, instead of in sequence as described above.

The amount of illumination exposure applied to each of the positives P(1) and P(2) is determined in accordance with the damping computation routine of Equation 16. For example, if the previously mentioned value of $K=1.5$ is assumed, the factor $(2K-1)/(2K+1)$ in Equation 16 is equal to ½. For this condition, the illumination exposure applied to a particular positive is reduced by a factor of two for each succeeding cycle. In the present case, therefore, the first positive P(1) receives one-half the illumination exposure received during the first cycle and the second positive P(2) receives the same illumination exposure that the first positive P(1) was given during the first cycle. Thus, the average illumination values at the points in the second blurred negative B(2) are a weighted average of the illumination values at the corresponding points in the low-pass spatially filtered positive images. This point is discussed in more detail hereinafter.

In step (c), the second blurred negative B(2) is uniformly illuminated to expose film which is then developed to provide a second mask M(2). The transmissivity values at the points in the second mask M(2) are a fixed function of the exposure values of the second blurred negative B(2) at the corresponding points. As in the previous cycle, the illumination exposure is adjusted such that the film used to form the second mask M(2) operates in the linear range of its sensitometric curve. The second mask M(2) is then used in step (a) of the third and final cycle of the process.

Third cycle.—In step (a) of the third cycle, the second mask M(2) is superimposed on the negative N and the combination is uniformly illuminated to expose a film which is then developed to provide the third (compressed) positive P(3). In this step, the transmissivity values at the points in the third positive P(3) are a fixed function of the product of the transmissivity values at the corresponding points in the negative N and the second mask M(2). As in previous cycles, the value of illumination exposure is adjusted such that the average value of the relative transmissivity $T_p$ of the third positive P(3) is 0.5.

In step (b), the positives P(1), P(2), and P(3) are uniformly illuminated in sequence, (or simultaneously), and the projected images are low-pass spatially filtered and directed onto film which has been previously fogged as in the previous cycles. The same amount of fogging is used as in the corresponding steps of the previous cycles. The film is then developed to provide a third blurred negative B(3). For the assumed typical value of $K=1.5$, the illumination exposure applied to the first positive P(1) is one-quarter the illumination exposure applied thereto in the first cycle; the illumination exposure applied to the second positive P(2) is one-half that applied to the first positive P(1) in the first cycle; and the illumination exposure applied to the third positive P(3) is equal to the illumination exposure applied to the first positive P(1) in the first cycle. Thus, the average illumination values at the points in the third blurred negative B(3) are a weighted average of the illumination values at the corresponding points in the low-pass spatially filtered positive images.

In step (c), the third blurred negative B(3) is uniformly illuminated to expose film which is then developed to provide a third and final mask M(3). The transmissivity values at the points in the third mask M(3) are a fixed function of the exposure values of the third blurred negative B(3) at the corresponding points. As in previous cycles, the illumination exposure is adjusted such that the film used to form the third mask M(3) operates in the linear range of its sensitometric curve.

Final step.—The process is concluded by superimposing the third mask M(3) on the starting negative N, and the combination is uniformly illuminated to expose film or photographic printing paper which is then developed to provide an enhanced positive EP. The enhanced positive EP is a print or transparency of any suitable form or size. In this step, the transmissivity values at the points in the enhance positive EP are a fixed function of the product of the transmissivity values of the negative N and the third mask M(3) at the corresponding points.

In the above-described feedback image enhancement process, care is exercised to keep the image of the various steps appropriately controlled in size and registration. A convenient approach is to use 1:1 contact prints in steps (a) and (c), and to spatially filter in step (b) in such a manner that no change in size results. Appropriate registration marks can be applied to the films to keep the images in proper registration. Further, it is to be appreciated that enlarging or reduction can be employed at any step of a cycle provided that the size change is compensated for by appropriate reduction or enlarging at another step.

Detailed equations for feedback image enhancement process

In the following section, the detailed equations for the various steps (a) through (c) of the various cycles of the feedback image enhancement process are presented.

Step (a).—Equation 12 requires that the transmissivity $T_p$ of the positive such as P(1), P(2), etc.) should be related as follows to the density $D_s$ of the mask-negative combination, (which represents only the negative N in the first cycle, and the combination of the negative N and the mask M in later cycles)

$$T_p = \frac{1}{2}\{1 + \tanh[(1.15/\gamma_N)(D_s + d_0)]\} \qquad (20)$$

The logarithm of the exposure $E_p$ applied to the positive is proportional to the density $D_s$ of the combination. Hence, $$D_s = -\log_{10}(C_4 E_p) \qquad (21)$$

where $C_4$ is a constant that depends on the illumination exposure applied to the mask-negative combination when exposing the positive. From Equation 21, Equation 20 can be expressed in the form $$T_p = (\tfrac{1}{2})\{1 - \tanh[(1.15/\gamma_N)\log_{10}(C_5 E_p)]\} \qquad (22)$$

where $C_5$ is a constant. Equation 23 can also be expressed alternatively as $$T_p = (\tfrac{1}{2})\{1 - \tanh[(\tfrac{1}{2})\log_e(C_6 E_p^{1/\gamma_N})]\} \qquad (23)$$

where $C_6$ is a constant. Equation 24 can also be expressed as $$T_p = [1 + C_6 E_p^{1/\gamma_N}]^{-1} \qquad (24)$$

Equation 24 relates the exposure $E_p$ applied to a positive in step (a) to the relative transmissivity $T_p$ of the positive. Commercially-available film often closely approximates the following characteristic in the low-exposure region:

$$T = [1 + C_7 E^\gamma]^{-1} \qquad (25)$$

where $T$ is the relative transmissivity of the exposed film, $E$ is the exposure applied to the film, $\gamma$ is the gamma of the film, and $C_7$ is a constant. Comparing Equations 24 and 25 shows that the desired characteristic for step (a) can be very adequately satisfied by many films where the gamma $\gamma_p$ of the film used to derive the positive is given by $$\gamma_p = (1/\gamma_N) \qquad (26)$$

Thus, for step (a), a film is preferably selected for the positive which has a gamma $\gamma_p$ equal to the reciprocal of the gamma $\gamma_N$ of the original negative. As stated previously, the illumination exposure in step (a) is preferably selected such that the average relative transmissivity $T_p$ of the positive over the whole image is approximately equal to 0.5.

Step (b).—For simplicity in the ensuing discussion, the relative transmissivities of the first, second, third, etc. positives (exposed in the first, second, third, etc. cycles) may be conveniently designated as $T_p(1)$, $T_p(2)$, $T_p(3)$, etc., respectively. The time integral of the intensity of the illumination pattern emerging from an illuminated positive in step (b) is proportional to the relative transmissivity of the positive and the illumination exposure applied to the positive. The time integral of the intensity of the illumination pattern emerging from the first positive during the first cycle may be designated as $[E_{bo}T_p(1)]$. If losses in the spatial-fitting optics are neglected, the time integral of the illumination intensity (which is, by definition, the exposure) applied to the blurred negative during step (b) is $$E_b(1) = E_{bo}\overline{T}_p(1) \qquad (27)$$

where $\overline{T}_p(1)$ is the low-pass spatially-filtered modification of the image $T_p(1)$. Equation 27 assumes that there is no change of image size in the spatial filtering. From Equation 19, the exposure applied to the blurred negative during the $q$th cycle is $$E_b(q)E_{bo}\sum_{r=0}^{q-1}\left[\frac{2K-1}{2K+1}\right]^r \overline{T}_p(q-r) \qquad (28)$$

Thus from Equation 19

$$E_b(q) = [E_{bo}(2K+1)/2]\overline{T}_p(q) \qquad (29)$$

Near the "toe" of the sensitometric curve of most films there is a non-linear region where the density is approximately a linear function of exposure. In some films, this region covers a larger range than in others. In step (b), the film is preferably operated in this nonlinear region by fogging the film to (establish a minimum value of exposure at the lower limits of this region), and by controlling the illumination (so that the maximum exposure does not exceed the upper limit of this region). Therefore, the density $D_B$ of the blurred negative B exposed in step (b) is related as follows to the exposure $E_b$ applied after fogging $$D_B = [\partial D_B/\partial E_B]E_B + C_8 \qquad (30)$$

where $C_8$ is a constant and $(\partial D_B/\partial E_B)$ is the slope of the density-versus-exposure curve in the non-linear region where the film is operated. Substituting Equation 29 into Equation 30 gives $$D_B = \left[\frac{E_{bo}(2K+1)}{2}\right]\left[\frac{\partial D_B}{\partial E_B}\right]T_p' \qquad (31)$$

Step (c).—The film for producing the mask M is operated completely in its linear range, and so the density $D_M$ of the mask M is given by $$D_M = -\gamma_M \log_{10} E_M + C_9 \qquad (32)$$

where $\gamma_M$ is the gamma of the mask film, $E_M$ is the exposure applied to the film, and $C_9$ is a constant. The exposure $E_M$ applied to the mask film is proportional to the transmissivity of the blurred negative. Hence, Equation 32 can be expressed as $$D_M = -\gamma_M D_B + C_{10} \qquad (33)$$

where $C_{10}$ is a constant. Substituting Equation 31 into Equation 33 gives $$D_M = -(\tfrac{1}{2})\gamma_M E_{bo}(2K+1)(\partial D_B/\partial E_B)\overline{T}_p' + C_{11} \qquad (34)$$

where $C_{11}$ is a constant. Equating Equations 18 and 34 gives $$E_{bo} = \left[\frac{2(1.74)K}{(2K+1)}\right]\left[\frac{\gamma_N}{\gamma_M}\right]\left[\frac{\partial E_B}{\partial D_B}\right] \qquad (35)$$

Equation 35 describes the illumination exposure required for the lastest positive in step (b) to achieve a particular value of the enhancement constant $K$.

A convenient means of setting $E_{bo}$ is to illuminate a clear positive with the exposure $E_{bo}$ for which the relative transmissivity $T_P$ is unity, and thereby expose a blurred negative B, and from this produce a mask M. A mask is also produced from a blurred negative B which is unexposed except for the fogging. The differences in the densities of these two masks, designated as $\Delta D_{M'}$ is equal to $$\Delta D_M = \gamma_M[\partial D_B/\partial E_B]E_{bo} \qquad (36)$$

Substituting Equation 36 into Equation 35 gives $$\Delta D_M = 3.48 K\gamma_N/(2K+1) \qquad (37)$$

Equation 37 allows the enhancement constant to be conveniently controlled. For example, if $K=1.5$, and $\gamma_N=1$, then $\Delta D_M = 1.30$. Thus, in this case, the exposure illumination for step (b) should be adjusted so that the density of the mask changes by 1.30 when the relative transmissivity of the positive is changed from 0 to 1.0 during the test.

Low-pass spatial filtering apparatus—FIG. 2

In step (b) of each cycle of the feedback image enhancement process of the present invention, a spatial filtering operation is performed wherein the images of the various positives are filtered to attenuate the high spatial-frequency components thereof. The spatial filtering may be accomplished in several ways. For example, spatial filtering may be accomplished in a somewhat crude manner by conventional photographic optical apparatus by simply defocusing the optics of the apparatus. The effect of the defocusing is to blur each line of the image on the positive into a uniform band in the defocused image. The cross section of a blurred line produced by such defocusing is a square. Therefore, the transfer function of the simple defocusing operation is the Fourier transform of a square pulse which is (sin $AW$)/$AW$, where W is a frequency variable and A is a constant. Since this transfer function provides attenuation of high-frequency data, the defocusing operation represents a low-pass spatial filtering operation. However, the above-mentioned transfer function has an infinite series of high-frequency peaks which gradually decay with increasing spatial frequency. These peaks add undesirable high spatial-frequency detail to the defocused image which cause artifacts to appear in the resultant enhanced image.

To achieve more effective spatial filtering, a line on the original negative image should produce a blurred image that peaks at the center and decays gradually and monotonically from the center (approximately like an exponential function). This characteristic can be achieved by designing a projection lens so as to have appropriate abberations whereby the blurred image peaks at the center and decays gradually and monotonically from the center. Another approach is to defocus the optics of a projection system, and to vary the aperture of a lens included in the projection system during the exposure by means of an iris. As the aperture is increased, the width of the blurred line increases, and so the average blurred line can be appropriately shaped.

A more suitable and convenient apparatus for providing effective low-pass spatial frequency filtering is shown at 20 in FIG. 2. As shown therein, the low-pass spatial frequency filtering apparatus 20 comprises a diffuse radiator 21, such as a set of fluorescent lamps covered by a frosted glass, a spatial filter mask 22 spaced from the diffuse radiator 21, and a lens 23 spaced from the spatial filter mask 22 by a distance equal to the focal length of the lens 23. The spatial filter mask 22 is a transparency with a circularly-symmetric transmissivity pattern such that the transmissivity is maximum at the center of the mask and decreases gradually from the center of the mask to the edge of the mask.

In operation, light rays are directed by the diffuse radiator 21 through the spatial filter mask 22. Because of the above-mentioned variable transmissivity pattern of the spatial filter mask 22, a central light ray $R_C$ illuminating a particular point on the lens 23 has a greater intensity than a side ray $R_1$ or a side ray $R_2$ passing through the mask 22 at the outer edges thereof where the transmissivity is less than at the center. The lens 23 refracts the incident light so that the central ray $R_C$ is parallel to the axis of the lens 23 and the side rays $R_1$ and $R_2$ remain slightly divergent. By the above action, a positive transparency is illuminated by somewhat diffused light in which the perpendicular rays have the maximum intensity and the intensity decreases with angle from the perpendicular in accordance with the transmissivity function of the spatial filter mask 22. Unexposed film is placed an appropriate distance below the positive transparency to obtain the desired width of the spatial blur. The shape of the blur on the "blurred" negative for each point in the enhanced positive depends upon the transmissivity pattern of the spatial filter mask 22. When spatial filtering is accomplished with the arrangement 20 of FIG. 2, the blurred image of a line has a desirable cross-section that peaks in the center and decays gradually at both sides of the center.

Modifications

In the practical embodiment of the invention described hereinbefore, the images in all the steps of the process are recorded photographically. However, in other embodiments of the invention, different media may be used for storing the imagery data. Nevertheless, these variations of implementation do not alter the principle of the invention.

For example, the function of the mask may be implemented by means of a cathode ray tube, rather than by photographic film, as in the practical embodiment described hereinbefore. The mask image is then represented by the two-dimensional pattern of brightness over the surface of the cathode ray tube rather than by the two-dimensional pattern of transmissivity values over the transparency that forms the mask in the practical embodiment described hereinbefore.

As another alternative embodiment, the spatial filtering can be performed electronically rather than optically. More particularly, the compressed positive transparency is scanned to form an electronic signal, and the signal is then processed electronically to form a spatially filtered imagery signal.

What is claimed is:
1. Spatial filtering apparatus comprising:
   a source of diffused illumination;
   a mask disposed in front of the source of diffused illumination and having a circularly-symmetric transmissivity pattern; and
   a lens spaced in front of the mask a distance equal to the focal length of the lens for refracting illumination directed thereon from the source of illumination after passage through the mask.

References Cited

UNITED STATES PATENTS

| | | | |
|---|---|---|---|
| 3,436,840 | 4/1969 | Noxon | 350—314 UX |
| 1,562,757 | 11/1925 | Hammond | 350—205 UX |
| 3,584,948 | 6/1971 | Herriott | 350—162 SF UX |
| 3,312,143 | 4/1967 | Karow et al. | 350—314 X |

JOHN K. CORBIN, Primary Examiner

U.S. Cl. X.R.

350—188, 205; 355—71